United States Patent
Yin et al.

(10) Patent No.: US 9,531,980 B2
(45) Date of Patent: Dec. 27, 2016

(54) METHOD AND APPARATUS FOR SENDING AND RECEIVING AUDIO DATA

(71) Applicant: Zhejiang Dahua Technology Co., Ltd., Zhejiang (CN)

(72) Inventors: Jun Yin, Zhejiang (CN); Zhicheng Ye, Zhejiang (CN); Chenge Liao, Zhejiang (CN); Xingming Zhang, Zhejiang (CN); Liquan Fu, Zhejiang (CN); Jiangming Zhu, Zhejiang (CN); Jun Wu, Zhejiang (CN); Jian Wu, Zhejiang (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 14/442,803

(22) PCT Filed: May 23, 2013

(86) PCT No.: PCT/CN2013/076172
§ 371 (c)(1),
(2) Date: May 14, 2015

(87) PCT Pub. No.: WO2014/075434
PCT Pub. Date: May 22, 2014

(65) Prior Publication Data
US 2015/0312507 A1 Oct. 29, 2015

(30) Foreign Application Priority Data
Nov. 15, 2012 (CN) .......................... 2012 1 0465495

(51) Int. Cl.
*H04N 5/38* (2006.01)
*H04N 5/60* (2006.01)
(Continued)

(52) U.S. Cl.
CPC .................. *H04N 5/38* (2013.01); *H04N 5/60* (2013.01); *H04N 5/602* (2013.01); *H04N 7/0355* (2013.01);
(Continued)

(58) Field of Classification Search
CPC  H04N 9/806; H04N 21/4394; H04N 21/4408; H04N 5/60; H04N 7/083; H04N 9/44; H04N 9/8211
See application file for complete search history.

(56) References Cited

U.S. PATENT DOCUMENTS

| | | | | |
|---|---|---|---|---|
| 4,563,702 A | * | 1/1986 | Heller | .................. H04N 7/1675 348/E7.056 |
| 5,585,858 A | * | 12/1996 | Harper | .................. G09B 5/065 348/473 |
| 2008/0095518 A1 | | 4/2008 | Hsieh et al. | |

FOREIGN PATENT DOCUMENTS

| | | |
|---|---|---|
| CN | 1144376 A | 3/1997 |
| CN | 1512690 A | 7/2004 |

(Continued)

OTHER PUBLICATIONS

International Search Report for corresponding International Application No. PCT/CN2013/076172 mailed Aug. 29, 2013.

*Primary Examiner* — Michael Teitelbaum
(74) *Attorney, Agent, or Firm* — Renner, Otto, Boisselle & Sklar, LLP (57) ABSTRACT

A method and an apparatus for sending and receiving audio data, so as to solve the problem that in the prior art, a simulating audio and video transmission system is complex in cable connection structure. The audio data is overlaid at a preset position of a video blanking interval of video data, sending and receiving of audio signals are carried out, and co-cable transmission of the audio and video data can be achieved.

12 Claims, 4 Drawing Sheets

(51) Int. Cl.

| | | |
|---|---|---|
| *H04N 7/083* | (2006.01) | |
| *H04N 21/43* | (2011.01) | |
| *H04N 9/44* | (2006.01) | |
| *H04N 7/035* | (2006.01) | |
| *H04N 7/06* | (2006.01) | |
| *H04N 7/085* | (2006.01) | |
| *H04N 21/4363* | (2011.01) | |

(52) U.S. Cl.
CPC ................ *H04N 7/06* (2013.01); *H04N 7/083* (2013.01); *H04N 7/085* (2013.01); *H04N 9/44* (2013.01); *H04N 21/43632* (2013.01)

(56) References Cited

FOREIGN PATENT DOCUMENTS

| | | |
|---|---|---|
| CN | 1750638 A | 3/2006 |
| CN | 201892937 U | 7/2011 |
| JP | 6-253273 | 9/1994 |

\* cited by examiner

METHOD AND APPARATUS FOR SENDING AND RECEIVING AUDIO DATA

This application is a US National Stage of International Application No. PCT/CN2013/076172, filed on May 23, 2013, designating the United States and claiming the priority to Chinese Patent Application No. 201210465495.6, filed with the State Intellectual Property Office on Nov. 15, 2012 and entitled "Methods and devices for transmitting and receiving audio data", the content of which is hereby incorporated by reference in its entirety.

FIELD

The present invention relates to the field of audio and video transmission and particularly to methods and devices for transmitting and receiving audio data.

BACKGROUND

Rapid transmission of audio and video data over a less amount of resources has become a current development trend in audio and video data transmission along with the development of sciences and technologies.

In an existing analog audio and video data transmission system, specified cables are required to connect a transmitter and a receiver for different data transmission, and if audio data are required to be transmitted together with video data, then another cable different from a cable over which the video data are transmitted needs to be added to connect the transmitter and the receiver for transmitting audio data so as to transmit the audio data.

Thus the video data and the audio data are transmitted respectively over different cables so that the cables are complicated in connection structure and costly in engineering in the existing analog audio and video transmission system.

SUMMARY

An object of the invention is to provide methods and devices for transmitting and receiving audio data so as to address the problem of the cables complicated in connection structure in the existing analog audio and video transmission system.

The object of the invention is attained with the following technical solutions:

An aspect of the invention provides a method for transmitting audio data, the method including:

sampling and quantizing an analog audio signal and determining audio sampling values corresponding to the audio data to be transmitted;

buffering the audio sampling values into a buffer area in a First Input First Output (FIFO) method;

after a color synchronization signal of an analog video signal is detected, superimposing the audio sampling values buffered in the buffer area in video blanking intervals of the analog video signal, to obtain the analog video signal including an audio carrier sampled signal; and transmitting the analog video signal including the audio carrier sampled signal to a receiver.

Another aspect of the invention provides a method for receiving the audio data transmitted through the method for transmitting audio data above, the method including:

receiving an analog video signal including an audio carrier sampled signal;

deriving audio sampling values from video blanking intervals of the analog video signal after a color synchronization signal of the analog video signal is detected;

buffering the audio sampling values in a First Input First Output (FIFO) method into a buffer area; and composing a consecutive audio data stream from audio data corresponding to the audio sampling values buffered in the buffer area and outputting an audio signal.

The invention further provides a device for transmitting audio data, the device including:

a sampling module configured to sample and quantize an analog audio signal into audio sampling values corresponding to the audio data to be transmitted;

a buffering module configured to buffer the audio sampling values obtained by the sampling module as a result of sampling into a buffer area in a First Input First Output (FIFO) method;

a superimposing module configured, after a color synchronization signal of an analog video signal is detected, to superimpose the audio sampling values buffered by the buffering module in video blanking intervals of the analog video signal, to obtain the analog video signal including an audio carrier sampled signal; and a transmitting module configured to transmit the analog video signal, including the audio carrier sampled signal, obtained by the superimposing module to a receiver.

The invention further provides a device for receiving audio data, configured to receive the audio data transmitted through the device for transmitting audio data above, the device including:

a receiving module configured to receive an analog video signal including an audio carrier sampled signal;

a deriving module configured to derive audio sampling values from the analog video signal received by the receiving module in video blanking intervals of the analog video signal after a color synchronization signal of the analog video signal is detected;

a buffering module configured to buffer the audio sampling values derived by the deriving module in a First Input First Output (FIFO) method into a buffer area; and an outputting module configured to compose a consecutive audio data stream from audio data corresponding to the audio sampling values buffered by the buffering module into the buffer area and to output an audio signal.

With the methods and devices for transmitting and receiving audio data, the analog audio signal is sampled and quantized, the audio data are superimposed on the video data in the video blanking intervals, and the audio data are transmitted and received, to thereby transmit the audio and video data signals over the same cable so as to simplify the audio and video transmission system in structure and reduce the amount of cables in use, thus lowering the cost.

DETAILED DESCRIPTION OF THE EMBODIMENTS

In methods for transmitting and receiving audio data according to the invention, the audio data are superimposed in video blanking intervals of video data to thereby transmit and receive the audio signal, thus the audio and video data can be transmitted over the same cable.

The methods for transmitting and receiving audio data according to the invention will be described below in further details with reference to the drawings, and of course, the following embodiments are merely preferred embodiments of the invention but not intended to limit the invention thereto.

Figure 1:
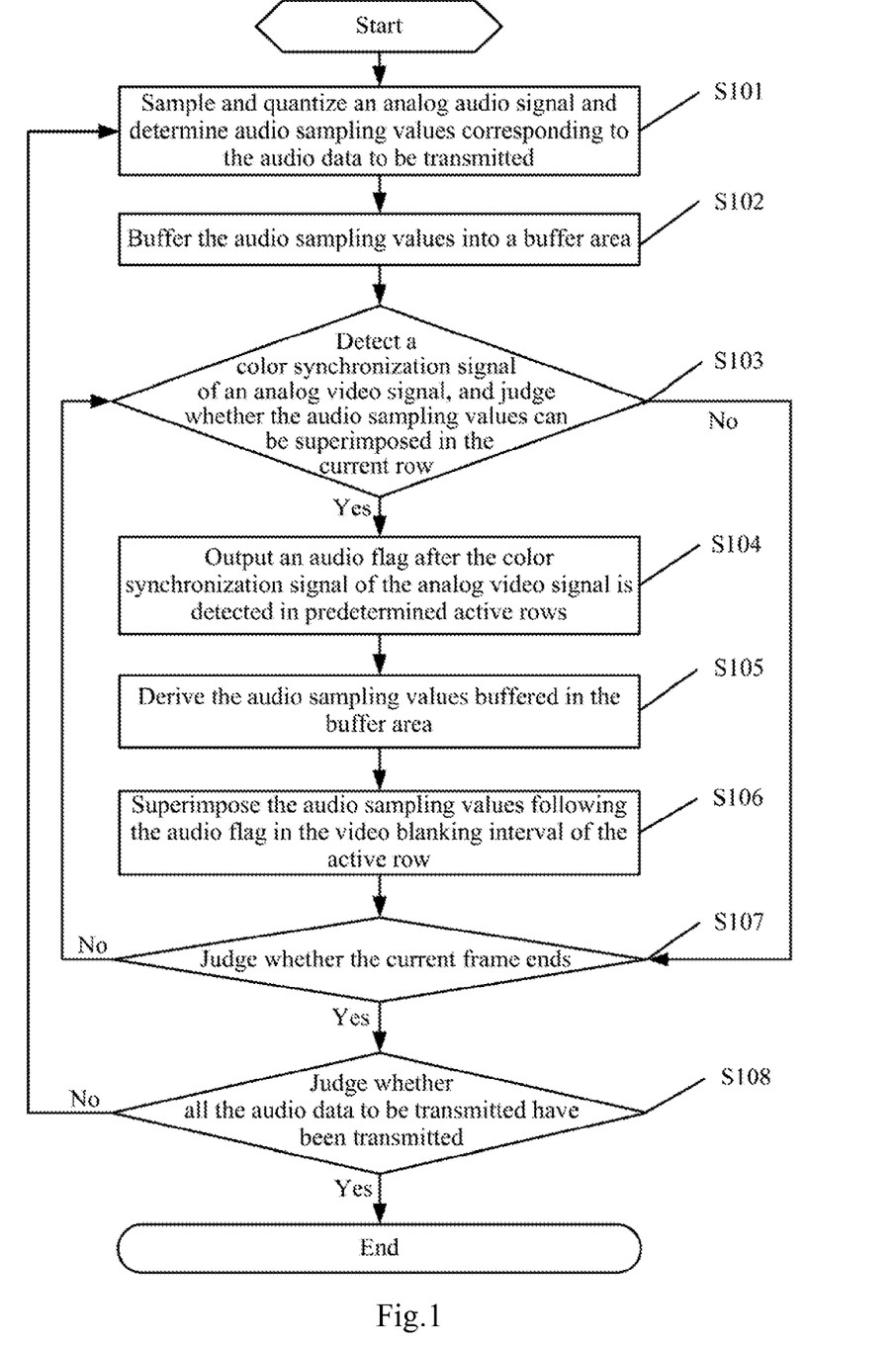
FIG. 1 illustrates a flow chart of a method for transmitting audio data according to an embodiment of the invention.

A first embodiment of the invention provides a method for transmitting audio data, and FIG. 1 illustrates a flow in which the method is performed.

Operation S101 is to sample and quantize an analog audio signal and to determine audio sampling values corresponding to the audio data to be transmitted.

Particularly in the embodiment of the invention, the analog audio signal output by an audio signal source is sampled in a uniform sampling manner that the analog audio signal is sampled at a uniform interval of time, and the sampling value corresponding to each sampling point is in proportion to the amplitude value of the signal, that is, the audio sampling values corresponding to the audio data to be transmitted are determined in a baseband modulation manner.

Furthermore since the audio signal source outputs the analog audio signal, and a data signal transmitted over a cable is generally a digital signal, analog to digital conversion is performed on the audio data to be transmitted after the audio signal is sampled and quantized.

Operation S102 is to buffer the audio sampling values corresponding to the audio data to be transmitted into a buffer area.

Here in the embodiment of the invention, the audio sampling values corresponding to the audio data to be transmitted are buffered into the buffer area in a First Input First Output (FIFO) method so that the audio data can be subsequently derived without changing the order in which the audio data are arranged, thereby improving the accuracy of transmission.

Preferably in the embodiment of the invention, since the audio data are superimposed in the video blanking intervals of the video data, and the audio data only need to be superimposed in some rows (a row in which the audio data are superimposed will be referred hereinafter to as an active row), the audio data need to be buffered by calculating an audio duration corresponding to the audio data to be superimposed in each active row as follows:

$$t_{Au-L} = t_F \times AL \div TL$$

Here $t_{Au-L}$ represents the audio duration corresponding to the audio data to be superimposed in each active row, $t_F$ represents a frame periodicity, AL represents the number of active rows in which the audio data can be superimposed, and TL represents the total number of rows in each frame.

After the audio duration corresponding to the audio data to be superimposed in each active row is calculated as above, the audio sampling values corresponding to the audio data to be transmitted can be stored into the buffer area in the form of audio segments according to the calculated audio duration, and the audio data can be superimposed by superimposing the audio sampling values corresponding to the audio segments directly in the video blanking intervals of the corresponding active rows.

Operation S103 is to detect a color synchronization signal of an analog video signal, and to judge whether the audio sampling values can be superimposed in the current row, and if so, then the flow goes to the operation S104; otherwise, the flow goes to the operation S107.

Here the color synchronization signal is a precondition for transmitting the audio signal and the video signal, that is, the audio sampling values can be superimposed only if there is a color synchronization signal in the current row, so in the embodiment of the invention, it is judged whether the audio sampling values can be superimposed in the current row by detecting whether there is a color synchronization signal.

Operation S104 is to output an audio flag after the color synchronization signal of the analog video signal is detected in predetermined active rows of the audio signal.

Here in the embodiment of the invention, the active rows in which the audio sampling values are superimposed are predetermined according to real conditions, and when the judgment result in the operation S103 is that the audio sampling values can be superimposed in the current row, then whether to superimpose the audio sampling values in the current row in which the audio sampling values can be superimposed, can be decided according to real conditions.

Furthermore when the current row is a predetermined active row in which the audio sampling values can be superimposed, after the color synchronization signal of the analog video signal is detected, an audio flag can be output to characterize the current row as an active row in which the audio sampling values are superimposed.

Preferably in order to enable a receiver to accurately parse for the superimposed audio sampling values, in the embodiment of the invention, after the color synchronization signal of the analog video signal is detected, an audio flag reference level is output to identify the row as an active row in which the audio data are superimposed.

Preferably in order to enable the receiver to well determine from the audio flag reference level whether the current row is an active row, the level value of the output audio flag reference level can be set to a predetermined level value higher than the level value of a blanking level of the analog video signal, and the receiver can determine an active row by comparing the detected audio flag reference level with the blanking level of the analog video signal and determining that the current row is an active row in which the sample values of the audio data are superimposed when the audio flag reference level is higher than the level value of the blanking level.

Operation S105 is to derive the audio sampling values buffered in the buffer area.

Here after the color synchronization signal of the analog video signal is detected, the audio sampling values buffered in the buffer area can be derived, and then the flow goes to the operation S106 where the audio sampling values are being superimposed in video blanking intervals of the analog video signal.

Operation S106 is to superimpose the audio sampling values, corresponding to the audio data, derived from the buffer area, following the audio flag in the video blanking interval of the active row.

Here the audio sampling values are superimposed by determining the level value of the output audio flag reference level as the zero level of the audio sampling values in an superimposed audio carrier and then superimposing the audio sampling values in the video blanking intervals of the analog video signal in accordance with the ratio of the audio sampling values to the value of zero level in the original analog video signal.

Preferably since there may be a phenomenon of tailing for the color synchronization signal, if the derived audio sampling values are superimposed directly, then the transmitted signal may be degraded in quality, so in the embodiment of the invention, a predetermined period of time as a start interval of time for the audio signal can be waited for, and then the audio data to be transmitted are superimposed at predetermined positions of the video blanking intervals of the video data, where a period of time $t_{Au-D}$ corresponding to the start interval of time of the audio signal needs to be waited for, and the size of the period of time for the start interval of time is determined by a tailing period of time for the color synchronization signal.

Figure 2:
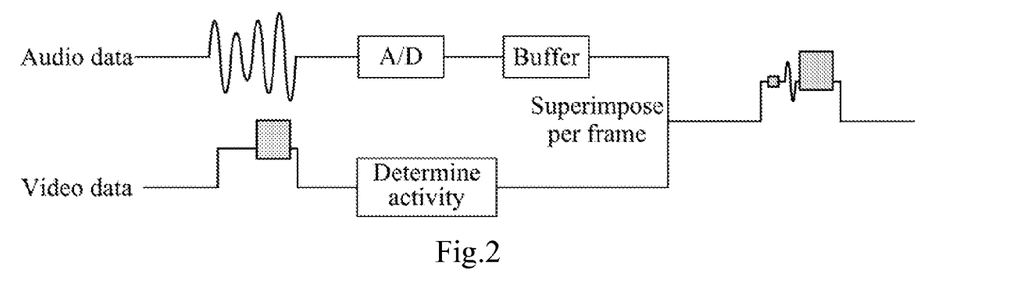
FIG. 2 illustrates a schematic diagram of a process of superimposing audio data on video data according to an embodiment of the invention.

Here after the audio data are superimposed at the predetermined positions of the video blanking intervals of the corresponding active rows, the analog video signal on which the audio data are superimposed at the predetermined positions of the video blanking intervals of the video data can be transmitted to the receiver, and FIG. 2 illustrates a schematic diagram of superimposing audio data according to an embodiment of the invention.

Figure 3:
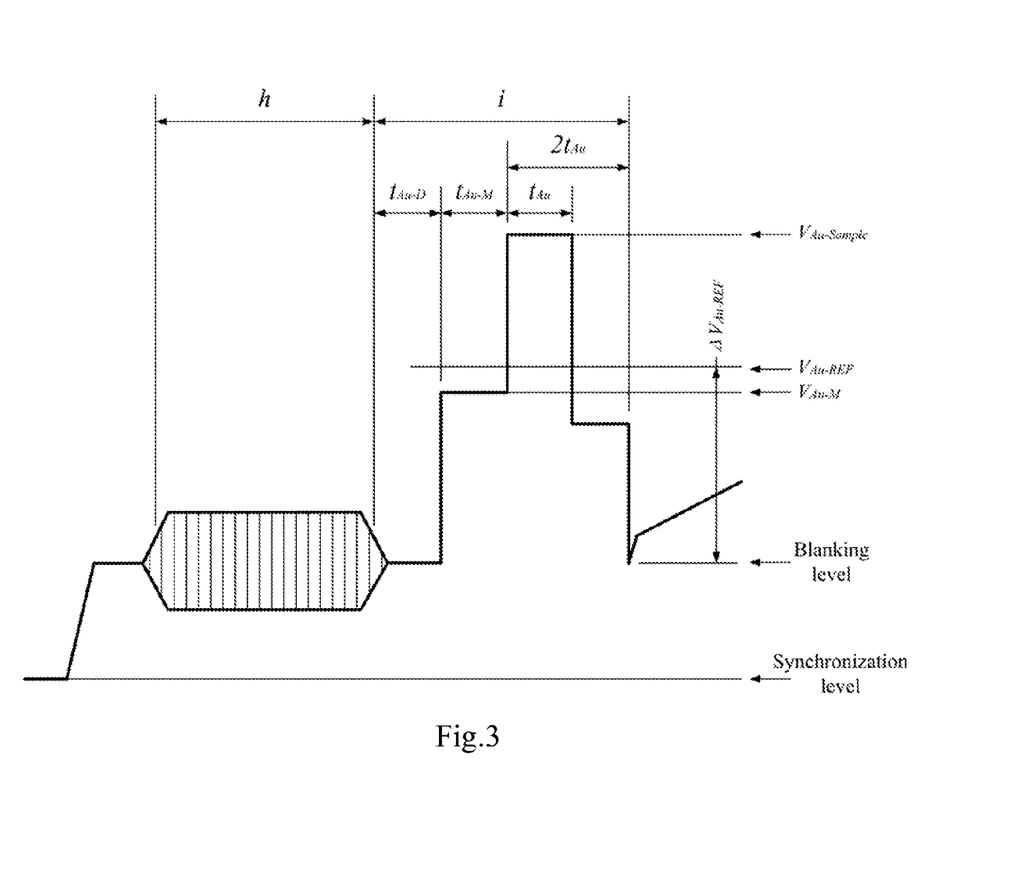
FIG. 3 illustrates a timing diagram of transmitting video data, on which audio data are superimposed, according to an embodiment of the invention.

FIG. 3 illustrates a timing diagram of transmitting video data on which audio data are superimposed.

As can be apparent from FIG. 3, the first level signal, after the period of time $t_{Au-D}$ corresponding to the start interval of time of the audio signal after the color synchronization signal h, is the audio flag reference level lasting for a period of time $t_{Au-M}$, and the audio flag reference level is followed by an audio carrier sampled signal which can include a plurality of, preferably two, consecutive audio sampling points, as illustrated in FIG. 3 where an audio sampling point lasts for a period of time $t_{Au}$, and when there are two audio sampling points, the audio carrier sampled signal lasts for a period of time $2^{t_{Au}}$. If i represents a period of time between the end of the color synchronization signal h and the end of the row blanking interval, then clock cycles and level values of the respective levels above can be depicted in Table 1 and Table 2:

TABLE 1

| Symbol | Parameter | Duration |
|---|---|---|
| $t_{Au-D}$ | Start interval of time of audio signal | i/4 |
| $t_{Au-M}$ | Duration of audio flag | i/4 |
| $t_{Au}$ | Duration of single sampling point of audio carrier | i/4 |

TABLE 2

| Symbol | Parameter | Voltage, V |
|---|---|---|
| $\Delta V_{Au-REF}$ | Difference between predetermined reference level and blanking level | 0.35 |
| $V_{Au-REF}$ | Predetermined reference level | 0.65 |

TABLE 2-continued

| Symbol | Parameter | Voltage, V |
|---|---|---|
| $V_{Au-M}$ | Audio flag reference level | 0.65 |
| $V_{Au-Sample}$ | Maximum value of audio sampling level | 1 |
|  | Zero value of audio sampling level | 0.65 |
|  | Minimum value of audio sampling level | 0.3 |

Further preferably in the embodiment of the invention, the audio data are superimposed in the unit of a frame, and after all the audio data are superimposed for the current active row, the flow goes to the operation S107.

Operation S107 is to judge whether the current frame ends, and if so, then the flow goes to the operation S108; otherwise, the operation S103 to the operation S106 are repeated to derive the audio sampling values corresponding to the audio segments to be superimposed in each active row from the buffer area and to superimpose the audio sampling values at predetermined position of the video blanking interval of the corresponding active row, so as to superimpose the audio data respectively in each active row in the frame until the current frame ends.

Operation S108 is to judge whether all the audio data to be transmitted have been transmitted, and if not, then the operation S101 to the operation S107 are repeated to superimpose the audio data in each active row in the next frame until all the audio data to be transmitted are transmitted; otherwise, the flow ends.

In the embodiment of the invention, the audio sampling values are superimposed in the video blanking intervals of the analog video signal, and the audio data are transmitted together with the video data without any additional cable over which the audio data are transmitted, to thereby lower the connection structural complexity of the analog audio and video transmission system; and moreover in the embodiment of the invention, the analog audio signal output by the audio signal source is sampled in a uniform sampling manner, that is, in the embodiment of the invention, the audio data superimposed in the blanking intervals of the video data are baseband modulated, and the receiver can determine an active row from the level signal upon reception of the transmitted data to thereby simplify deriving and parsing for the audio signal by the receiver.

Figure 4:
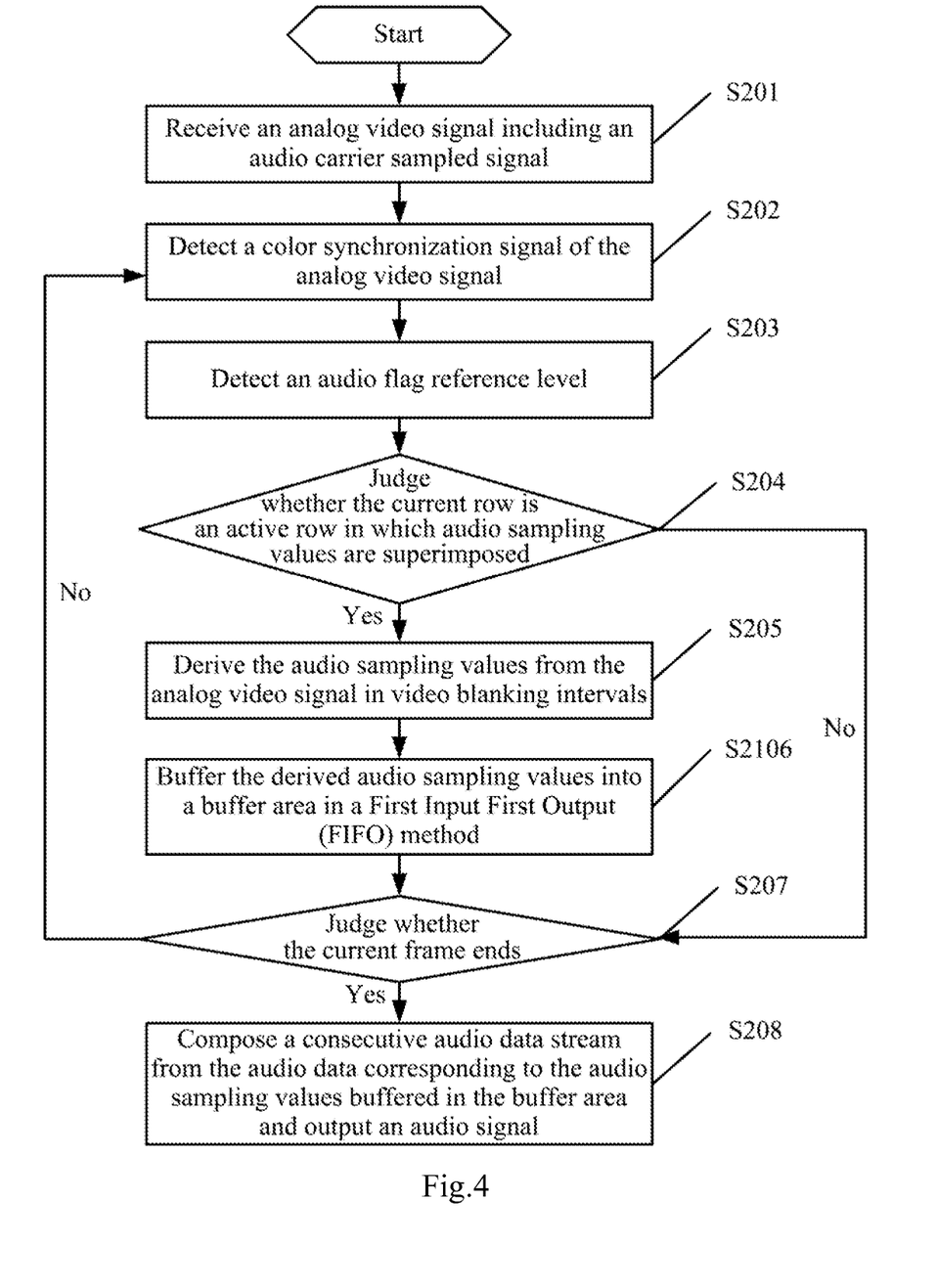
FIG. 4 illustrates a flow chart of a method for receiving audio data according to an embodiment of the invention.

A second embodiment of the invention provides a method for receiving the audio data transmitted through the method for transmitting audio data according to the first embodiment of the invention, and FIG. 4 illustrates a flow chart of a method for receiving audio data according to an embodiment of the invention.

Operation S201 is to receive an analog video signal including an audio carrier sampled signal.

Here the receiver receives the analog video signal which is the analog video signal on which the audio sampling values are superimposed at predetermined positions of the video blanking intervals of the analog video signal in the method according to the first embodiment of the invention.

Operation S202 is to detect a color synchronization signal of the analog video signal, and the flow goes to the operation S203 after the color synchronization signal of the analog video signal is detected.

Operation S203 is to detect an audio flag reference level.

Preferably since the audio flag reference level is output after a predetermined period of time, after the color synchronization signal is detected and before the audio data are superimposed in the first embodiment of the invention, the receiver can determine the first detected level after a predetermined period of time as the audio flag reference level, upon detection of the color synchronization signal of the analog video signal in the embodiment of the invention.

Operation S204 is to judge whether each row is an active row in which audio sampling values are superimposed.

Here in the embodiment of the invention, an active row can be determined from the detected audio flag reference level, i.e., the first level detected after the period of time corresponding to the start interval of time of the audio signal after the color synchronization signal of the analog video signal is detected.

Here an active row can be determined preferably as follows in the embodiment of the invention:

The detected audio flag reference level is compared with a blanking level of the analog video signal, and if the detected audio flag reference level is higher than the blanking level of the analog video signal, the current row is determined as an active row; otherwise, the current row is determined as an inactive row.

If the current row is determined as an active row in which the audio data are superimposed, then the flow goes to the operation S205; otherwise, the flow goes to the operation S207.

Operation S205 is to derive the audio sampling values from the analog video signal in video blanking intervals.

Figure 5:
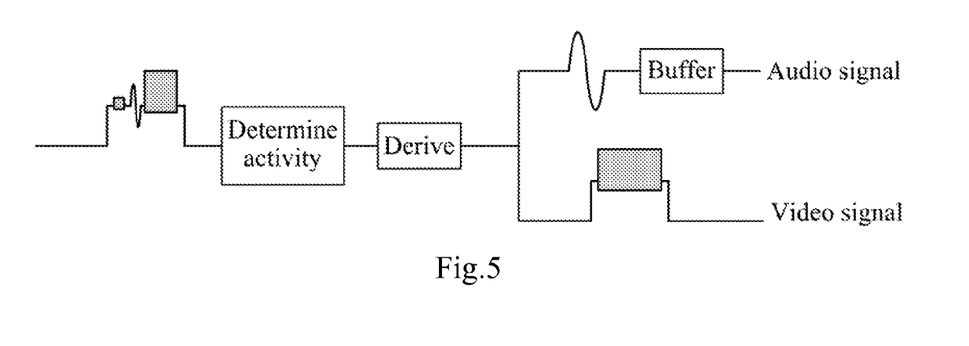
FIG. 5 illustrates a schematic diagram of a process of deriving audio data from video data according to an embodiment of the invention.

Here in the embodiment of the invention, when an active row is detected, it indicates that the audio sampling values corresponding to the audio data are superimposed in the current row, so in order to finally output the audio and the video separately, the audio data superimposed on the video data need to be derived in this operation so that the resulting separate audio data and video data are output separately. FIG. 5 illustrates a schematic diagram of a process of deriving audio data according to an embodiment of the invention.

Here after the color synchronization signal of the analog video signal is detected, the audio flag reference level is detected, and when the current row is determined as an active row in which the audio sampling values are superimposed, the audio sampling values are derived from the video blanking interval of the determined active row in accordance with the same ratio of the audio sampling values to the zero level as the transmitter.

Operation S206 is to buffer the derived audio sampling values into a buffer area in a First Input First Output (FIFO) method, and the flow goes to the operation S207.

Operation S207 is to judge whether the current frame ends.

In the embodiment of the invention, the audio data are derived from the video data in the unit of a frame, and when the current frame does not end, the operation S202 to the operation S206 are repeated to judge whether each row in the frame is an active row, to derive the audio data from the video data in each active row in the frame and to buffer the audio data, and then the flow goes to the operation S208.

Operation S208 is to compose a consecutive audio data stream from the audio data buffered in the buffer area and to output an audio signal.

In the method for receiving audio data according to the embodiment of the invention, it is judged whether the current row is an active row in which the audio sampling values are superimposed by judging whether the level signal is high or low, and the audio sampling values are derived from the current active row and then output separately, thus simplifying the process of deriving the audio signal and also outputting both the audio and the video concurrently.

Figure 6:
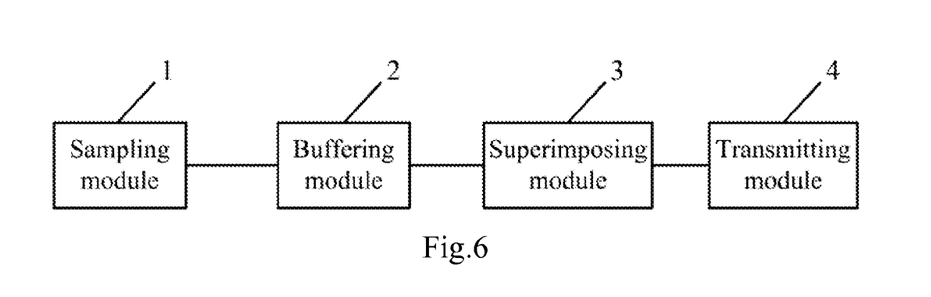
FIG. 6 illustrates a schematic diagram of components of a device for transmitting audio data according to an embodiment of the invention.

A third embodiment of the invention further provides a device for transmitting audio data, which corresponds to the method for transmitting audio data according to the first embodiment of the invention, and FIG. 6 illustrates a block diagram of the device including:

A sampling module 1 is configured to sample and quantize an analog audio signal into audio sampling values corresponding to the audio data to be transmitted;

A buffering module 2 is configured to buffer the audio sampling values obtained by the sampling module 1 as a result of sampling into a buffer area in a First Input First Output (FIFO) method;

A superimposing module 3 is configured, after a color synchronization signal of an analog video signal is detected, to superimpose the audio sampling values buffered in the buffering module 2 in video blanking intervals of the analog video signal, to obtain the analog video signal including an audio carrier sampled signal; and A transmitting module 4 is configured to transmit the analog video signal, including the audio carrier sampled signal, obtained by the superimposing module 3 to a receiver.

Here the buffering module 2 is configured:

To calculate an audio duration corresponding to the audio data to be superimposed in each active row based on a frame periodicity, the total number of rows in each frame, and the number of active rows in which the audio data can be superimposed in each frame, and to buffer the audio sampling values corresponding to the audio data to be transmitted in the audio duration into the buffer area.

The superimposing module 3 is configured:

To output an audio flag reference level after the color synchronization signal of the analog video signal is detected; and To determine the audio flag reference level as the zero level of the audio sampling values and to superimpose the audio sampling values in the video blanking intervals of the analog video signal in accordance with the ratio of the audio sampling values to the original zero level.

Preferably the superimposing module 3 is further configured:

To set the level value of the audio flag reference level to a level value higher than the level value of a blanking level of the analog video signal.

Further preferably the superimposing module 3 is further configured:

To wait for a predetermined period of time and then to output the audio flag reference level, after the color synchronization signal of the analog video signal is detected.

In the device for transmitting audio data according to the third embodiment of the invention, the audio sampling values are superimposed in the video blanking intervals of the analog video signal, and the audio data are transmitted together with the video data without any additional cable over which the audio data are transmitted, to thereby lower the connection structural complexity of the analog audio and video transmission system.

Figure 7:
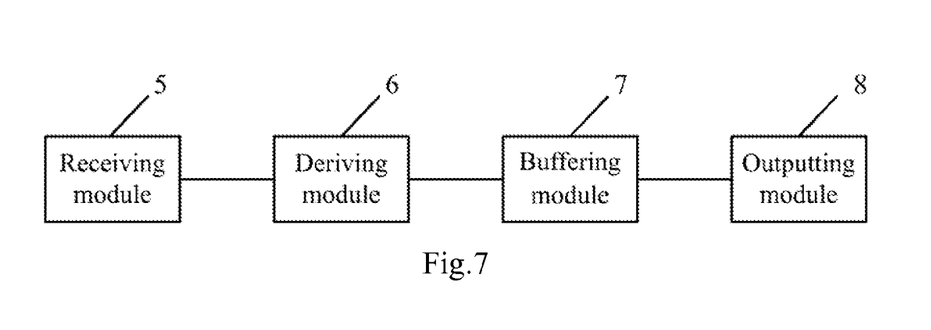
FIG. 7 illustrates a schematic diagram of components of a device for receiving audio data according to an embodiment of the invention.

A fourth embodiment of the invention further provides a device for receiving audio data, which is configured to receive the audio data transmitted through the device for transmitting audio data according to the third embodiment of the invention, and FIG. 7 illustrates a schematic diagram of components of the device including:

A receiving module 5 is configured to receive an analog video signal including an audio carrier sampled signal;

A deriving module 6 is configured to derive audio sampling values from the analog video signal received by the receiving module 1 in video blanking intervals of the analog video signal after a color synchronization signal of the analog video signal is detected;

A buffering module 7 is configured to buffer the audio sampling values derived by the deriving module 6 in a First Input First Output (FIFO) method into a buffer area; and An outputting module 8 is configured to compose a consecutive audio data stream from audio data corresponding to the audio sampling values buffered by the buffering module 7 and to output an audio signal.

Here the deriving module 6 is configured:

To detect an audio flag reference level after the color synchronization signal of the analog video signal is detected, and to determine an active row in which the audio sampling values are superimposed; and To derive the audio sampling values from the determined active row in accordance with the same ratio of the audio sampling values to the zero level as a transmitter, according to the level value of the detected audio flag reference level.

Preferably the deriving module 6 is further configured:

To compare the level value of the detected audio flag reference level with the level value of a blanking level of the analog video signal; and To determine the current row as an active row when the level value of the detected audio flag reference level is higher than the level value of the blanking level.

Further preferably the deriving module 6 is further configured:

To wait for a predetermined period of time and then to determine a first detected level signal as the audio flag reference level, after the color synchronization signal of the analog video signal is detected.

In the device for receiving audio data according to the fourth embodiment of the invention, when the analog video signal including the audio carrier sampled signal is received, it can be determined from the level signal whether the current row is an active row in which the audio sampling values are superimposed, and the audio sampling values can be derived directly in accordance with the specified ratio, thus simplifying the process of deriving and parsing for the audio signal by the receiver and also improving the efficiency in transmission of the audio signal.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting audio data, the method comprising:

sampling and quantizing an analog audio signal and determining audio sampling values corresponding to the audio data to be transmitted;

buffering the audio sampling values into a buffer area in a First Input First Output, FIFO, method;

after a color synchronization signal of an analog video signal is detected, superimposing the audio sampling values buffered in the buffer area in video blanking intervals of the analog video signal, to obtain the analog video signal comprising an audio carrier sampled signal; and transmitting the analog video signal comprising the audio carrier sampled signal to a receiver;

wherein buffering the audio sampling values into the buffer area comprises:

calculating an audio duration corresponding to the audio data to be superimposed in each active row based on a frame periodicity, the total number of rows in each frame, and the number of active rows in which the audio data can be superimposed in each frame, and buffering the audio sampling values corresponding to the audio data to be transmitted in the audio duration into the buffer area;

wherein after the color synchronization signal of the analog video signal is detected, superimposing the audio sampling values buffered in the buffer area in the video blanking intervals of the analog video signal comprises:
outputting an audio flag reference level after the color synchronization signal of the analog video signal is detected; and
determining the audio flag reference level as the zero level of the audio sampling values and superimposing the audio sampling values in the video blanking intervals of the analog video signal in accordance with the ratio of the audio sampling values to the original zero level.

2. The method according to claim 1, wherein the level value of the audio flag reference level is higher than the level value of a blanking level of the analog video signal.

3. The method according to claim 1, wherein after the color synchronization signal of the analog video signal is detected, the method further comprises:
waiting for a predetermined period of time, and then outputting the audio flag reference level.

4. A method for receiving the audio data transmitted through the method for transmitting audio data according to claim 1, the method comprising:
receiving an analog video signal comprising an audio carrier sampled signal;
deriving audio sampling values from video blanking intervals of the analog video signal after a color synchronization signal of the analog video signal is detected;
buffering the audio sampling values in a First Input First Output, FIFO, method into a buffer area; and
composing a consecutive audio data stream from audio data corresponding to the audio sampling values buffered in the buffer area and outputting an audio signal;
wherein deriving the audio sampling values from the video blanking intervals of the analog video signal after the color synchronization signal of the analog video signal is detected comprises:
detecting an audio flag reference level after the color synchronization signal of the analog video signal is detected, and determining an active row in which the audio sampling values are superimposed; and
deriving the audio sampling values from the determined active row in accordance with the same ratio of the audio sampling values to the zero level, according to the level value of the detected audio flag reference level.

5. The method according to claim 4, wherein determining the active row in which the audio sampling values are superimposed comprises:
comparing the level value of the detected audio flag reference level with the level value of a blanking level of the analog video signal; and
determining the current row as an active row when the level value of the detected audio flag reference level is higher than the level value of the blanking level.

6. The method according to claim 4, wherein after the color synchronization signal of the analog video signal is detected, the method further comprises:
waiting for a predetermined period of time, and then determining a first detected level signal as the audio flag reference level.

7. A device for transmitting audio data, comprising:
a first processor, wherein:
the first processor is configured to execute one or more computer readable program codes to perform:
sampling and quantizing an analog audio signal into audio sampling values corresponding to the audio data to be transmitted;
buffering the audio sampling values as a result of sampling into a buffer area in a First Input First Output, FIFO, method;
after a color synchronization signal of an analog video signal is detected, superimposing the audio sampling values in video blanking intervals of the analog video signal, to obtain the analog video signal comprising an audio carrier sampled signal; and
transmitting the analog video signal comprising the audio carrier sampled signal to a receiver;
wherein the first processor is configured to execute the one or more computer readable program codes to perform:
calculating an audio duration corresponding to the audio data to be superimposed in each active row based on a frame periodicity, the total number of rows in each frame, and the number of active rows in which the audio data can be superimposed in each frame, and buffering the audio sampling values corresponding to the audio data to be transmitted in the audio duration into the buffer area;
wherein the first processor is configured to execute the one or more computer readable program codes to perform:
outputting an audio flag reference level after the color synchronization signal of the analog video signal is detected; and
determining the audio flag reference level as the zero level of the audio sampling values and superimposing the audio sampling values in the video blanking intervals of the analog video signal in accordance with the ratio of the audio sampling values to the original zero level.

8. The transmitting device according to claim 7, wherein the level value of the audio flag reference level is higher than the level value of a blanking level of the analog video signal.

9. The transmitting device according to claim 7 wherein the first processor is configured to execute the one or more computer readable program codes to perform:
waiting for a predetermined period of time and then outputting the audio flag reference level, after the color synchronization signal of the analog video signal is detected.

10. A device for receiving audio data, configured to receive the audio data transmitted through the device for transmitting audio data according to claim 7, the device comprising:
a second processor, wherein:
the second processor is configured to execute one or more computer readable program codes to perform:
receiving an analog video signal comprising an audio carrier sampled signal;
deriving audio sampling values from the analog video signal in video blanking intervals of the analog video signal after a color synchronization signal of the analog video signal is detected;
buffering the audio sampling values in a First Input First Output, FIFO, method into a buffer area; and
composing a consecutive audio data stream from audio data corresponding to the audio sampling values into the buffer area and outputting an audio signal;
wherein the second processor is configured to execute the one or more computer readable program codes to perform:

detecting an audio flag reference level after the color synchronization signal of the analog video signal is detected, and determining an active row in which the audio sampling values are superimposed; and deriving the audio sampling values from the determined active row in accordance with the same ratio of the audio sampling values to the zero level, according to the level value of the detected audio flag reference level.

11. The receiving device according to claim 10, wherein the second processor is configured to execute the one or more computer readable program codes to perform:

comparing the level value of the detected audio flag reference level with the level value of a blanking level of the analog video signal; and determining the current row as an active row when the level value of the detected audio flag reference level is higher than the level value of the blanking level.

12. The receiving device according to claim 10, wherein the second processor is configured to execute the one or more computer readable program codes to perform:

waiting for a predetermined period of time and then determining a first detected level signal as the audio flag reference level, after the color synchronization signal of the analog video signal is detected.

* * * * *